United States Patent Office 3,305,039
Patented Feb. 21, 1967

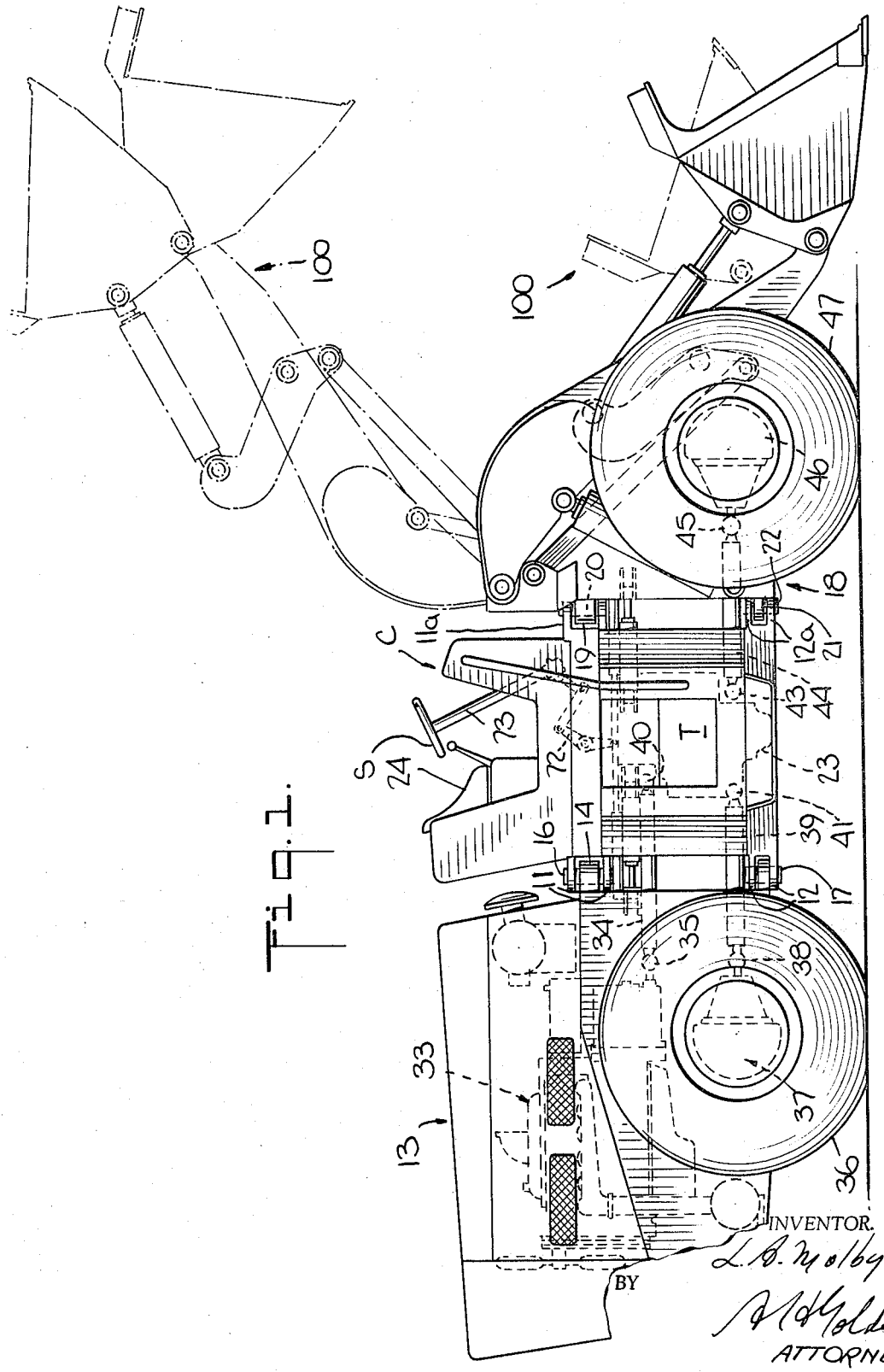

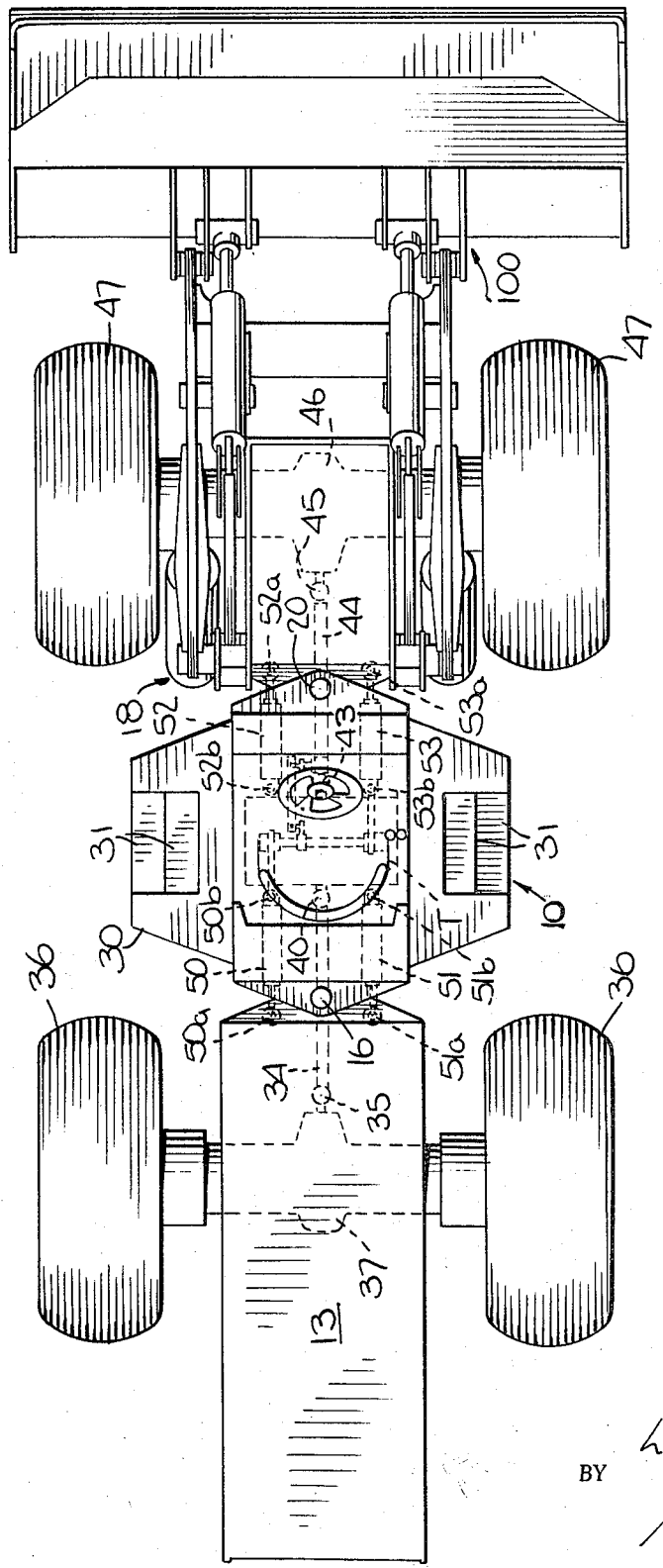

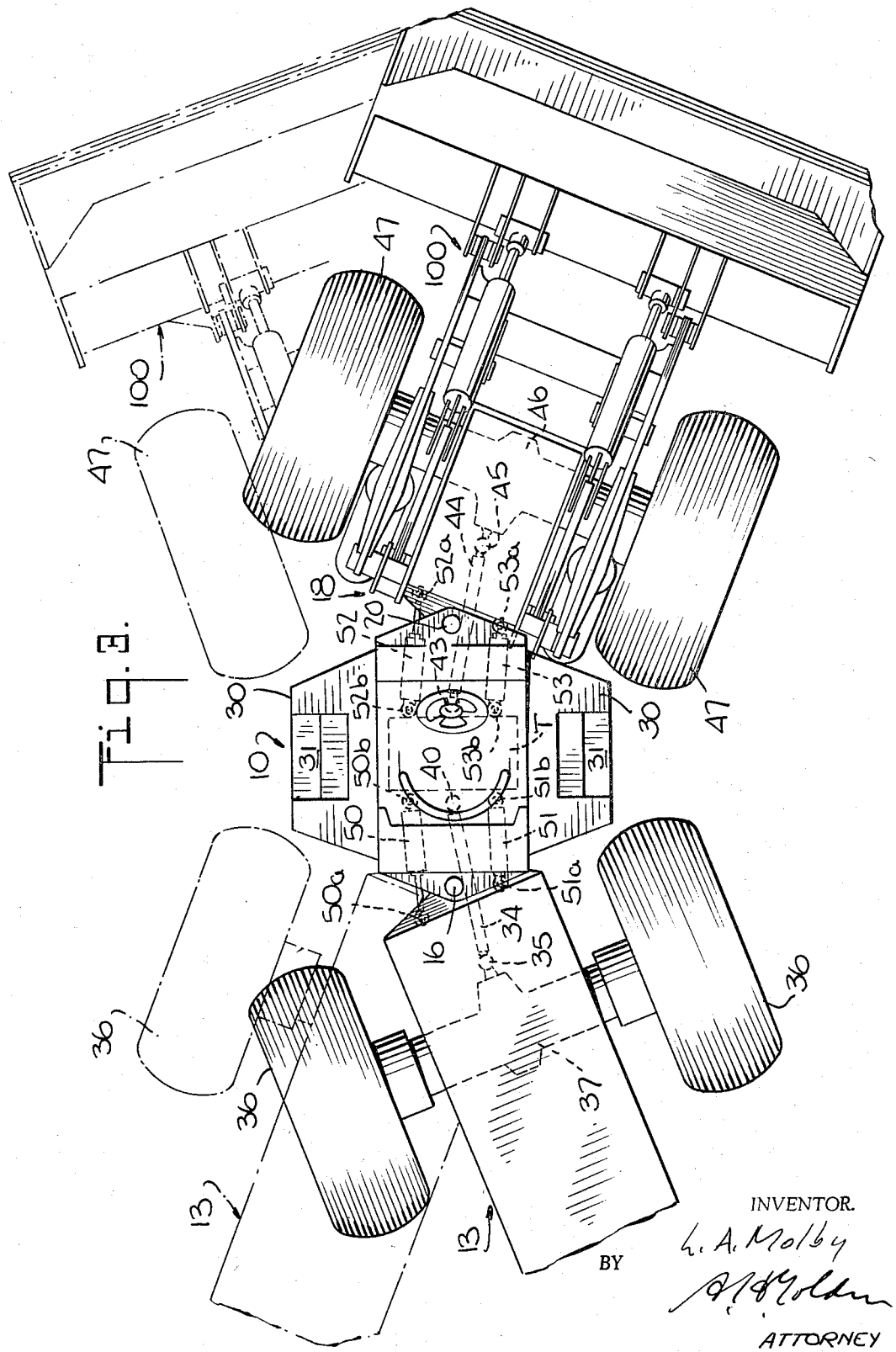

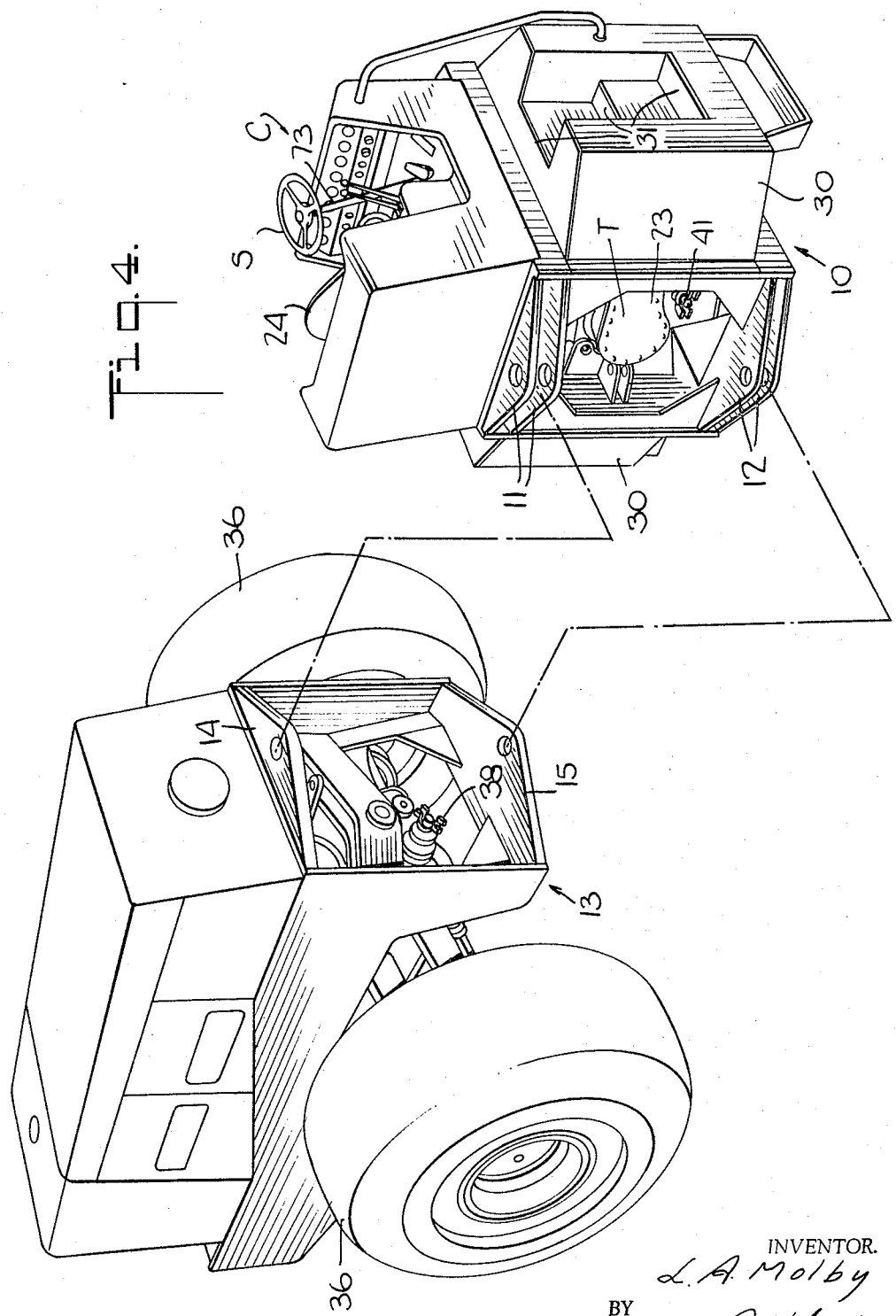

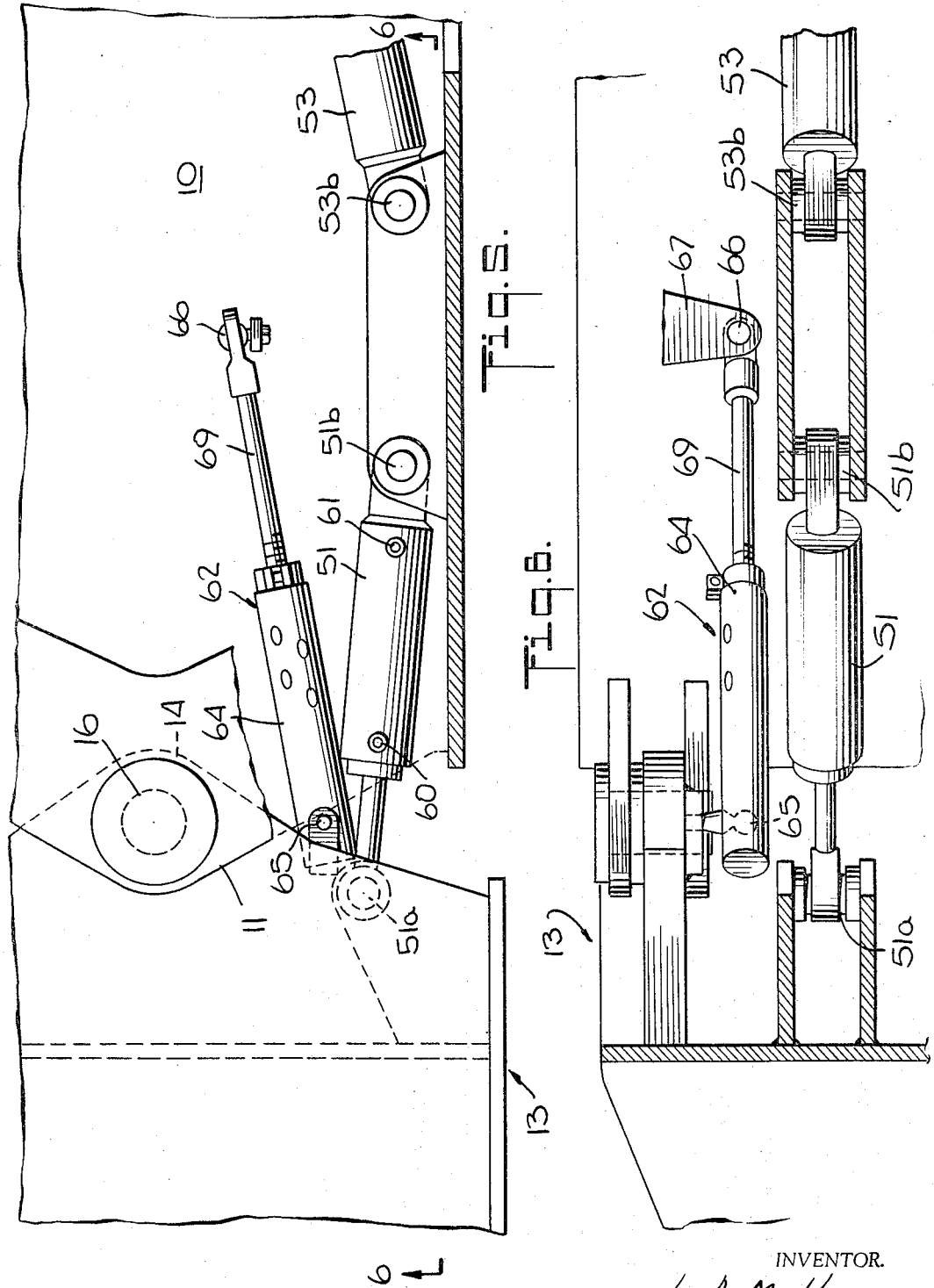

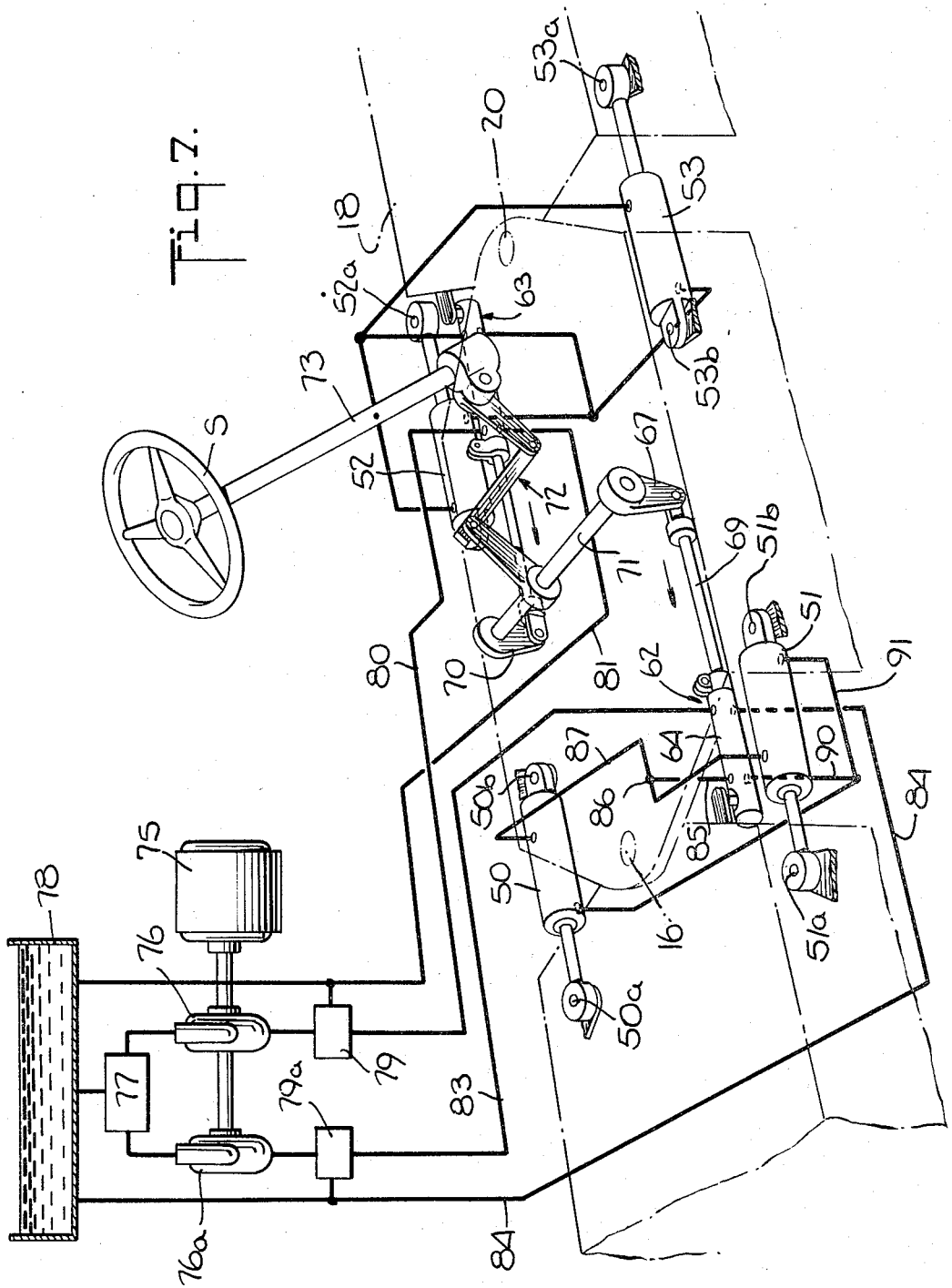

3,305,039
DOUBLE ARTICULATED TRACTOR SHOVEL
Lloyd A. Molby, Elba, N.Y., assignor to Eaton Yale & Towne Inc., a corporation of Ohio
Filed Sept. 18, 1964, Ser. No. 397,400
14 Claims. (Cl. 180—51)

This invention relates to an articulated vehicle particularly adapted for use as a shovel loader, although capable of use also as a bulldozer, log handler, or other material handling machine. The vehicle of my invention articulates about two pivots, and as those skilled in the art understand, vehicles of this general type are quite old and well known. However, I do not believe that there is found in the prior art a double articulated vehicle utilizing a central control unit symmetrically related to front and rear traction units whereby to contribute not only a very effective operating mechanical combination but also components that may be utilized in varying effective combinations.

As a feature of my invention I contribute an articulated vehicle of the class described having a central unit relatively to which may swing forward and rearward traction units, the swing being accomplished through the utilization of a novel type of steering mechanism that is symmetrical with regard to the central control unit and which operates effectively between the central control unit and the forward and rear traction units.

As a further particular feature of the combination of my invention, the forward and rear traction units are steered relatively to the central control unit through steering rams that are positioned symmetrically between the central control unit and the two traction units.

More particularly, I employ four steering rams arranged symmetrically relatively to the longitudinal axis and also the transverse axis of the central control unit. These steering rams when effectively related hydraulically, will swing the two traction units in a symmetrically related manner relatively to the central control unit to steer the vehicle and to stabilize it for handling loads.

As a further feature of the invention, the four steering rams are effectively controlled by two steering valves with the steering valves symmetrically positioned between the central control unit and the forward and rear traction units. As a detailed feature of the invention I may employ a standard type of valve having two elements movable longitudinally relatively to one another. Through connecting one of these elements of each value to a traction unit, and the other element to the steering apparatus of the central control unit, there can take place a particular related operation of the four steering rams.

As a still further feature of the invention, the central control unit preferably houses a power transmission which is connected through a telescopic drive shaft with the traction gears of the rear traction unit. The transmission is similarly connected by the same type of shaft with the traction gears of the forward traction unit. The two shafts lie in alignment with the longitudinal axes of the three units of the articulated machine when those units are positioned with their longitudinal axes in alignment.

As a still further feature of the invention, the central control unit is supported through upper and lower king pin pivots by the forward traction unit and by the rear traction unit, and the two shafts lie in the longitudinal line connecting the forward and rear king pins when the three units of the machine are positioned with their axes longitudinally aligned. In other words, the shafts lie in a position between the upper and lower king pins. Through the particular arrangement it is obvious that the transmission of power can be very effectively made with a minimum of angular pivoting of the shafts which, naturally, are connected at their ends to the transmission and the traction gears by universal joints. Further, the upper and lower king pins function to hold the three units of my articulated vehicle against twisting.

As those skilled in the art will appreciate particularly after reading the specification, the particular arrangement allows the central control unit to be utilized with various types of traction units adapted for varying end uses. The symmetrical balanced construction of the central unit is of particular value in contributing to the versatility of my vehicle combination. As a further particular feature of the invention, the central control unit carries its transmission centrally thereof and this transmission is actuated by a prime mover shaft which is exactly the same as one of the drive shafts driven by the transmission and described above. The prime mover shaft is also connected at its two ends by universal joints to the prime mover and transmission. The prime mover shaft actuating the transmission is operated by a prime mover that is preferably mounted on the rear traction unit. The prime mover shaft is in a position above the drive shaft extending between the rear traction unit and the transmission and in exact longitudinal alignment with the said drive shaft. Through the particular arrangement, there is an effective driving of the transmission by the prime mover and its shaft with the prime mover and its shaft swinging very effectively relatively to the transmission exactly as do the traction gears of the rear traction unit on which is supported the prime mover.

As a still further feature of the invention, my central control unit may readily be adapted for positioning with the operator facing forwardly or rearwardly. Further, since the transmission is centrally positioned it can be turned so that the unit carrying the prime mover may be connected to either of the ends of the central control unit.

As a further feature of my invention, the central control unit is adapted to carry symmetrically positioned fuel and hydraulic tanks with the tanks preferably functioning also, through an arrangement of the outer contours, as climbing stairs for the operator's movement into and out of the operating seat.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIG. 1 is an elevation showing my vehicle utilized for the mounting of a shovel loader on the forward traction unit.

FIG. 2 is a plan view looking downwardly on the vehicle shown in FIG. 1.

FIG. 3 is a view similar to FIG. 2 but showing in solid lines the position of the forward and rear traction units when the vehicle has been articulated to move in a clockwise direction. Parts of the vehicle are shown in dash and dot lines when the vehicle is adapted to move in a counterclockwise direction.

FIG. 4 is an exploded view showing in perspective the rear traction unit and the central control unit.

FIG. 5 is a plan view taken horizontally through a part of the vehicle and illustrating the arrangement of steering rams and a steering valve.

FIG. 6 is a section taken along lines 6—6 of FIG. 5.

FIG. 7 is a schematic illustration of the hydraulic lines and the relationship of the two steering valves and the four steering rams.

Referring now more particularly to the drawings, and especially to FIGS. 2, 3 and 4, reference numeral 10 indicates generally the central control unit of my articulated vehicle. This central control unit is symmetrical and has a pair of upper generally triangularly shaped flanges 11 at one end, and a similar pair of lower triangular flanges 12 at the same end. The opposed end of the central unit 10 has similar upper and lower pairs of flanges 11a and 12a.

The rear traction unit is designated generally by reference numeral 13 and it has an upper triangular flange 14 and a lower triangular flange 15. Flange 14 fits between flanges 11 as probably best seen in FIG. 1, and is connected to the flanges 11 through an upper king pin 16. The lower flange 15 is similarly connected to the lower flanges 12 through a lower king pin 17.

The forward traction unit of my vehicle is designated generally by reference numeral 18 and is equipped with an upper flange 19 similar to the flange 14 of the rear unit 13. Flange 19 is joined to upper flanges 11a of the central symmetrical unit by a king pin 20. The forward traction unit is also equipped with a lower flange 21 similar to the flange 15 of the rear traction unit 13. This lower flange 21 is connected to the spaced flanges 12a of the central unit through a king pin 22. Through the use of upper and lower king pins, as set forth, the central unit is well supported by the forward and rear traction units. Further, through the utilization of the upper and lower king pins as set forth, twisting of the central unit relatively to the traction units is prevented, while leaving considerable room for the mounting of power transmitting shafts, which shafts are in turn well adapted to transmit power without being subjected to stresses through other than the intended pivotal movement of the central control unit relatively to the opposed traction units.

The central control unit 10 has a centrally positioned transmission casing 23 within which is operatively mounted any suitable type of transmission T. This transmission T, together with the steering apparatus to which I shall refer later, is controlled by an operator seated at 24 in a cab C carried at the top of the central unit 10. It is not necessary to describe in detail the transmission T or the manner in which it is controlled, since such means may very well be conventional. It is well to indicate, however, that the cab C may very well be reversed from its position illustrated in the drawings, and the transmission casing may itself be rotated 180° relatively to the central control unit, if that be desired. Also, the entire central unit may be reversed for use with a different arrangement of traction units.

At each transverse side of the unit 10 there is mounted a casing 30, one of which is best seen in FIG. 4, the outward defining surface of which is in the form of a series of stairs 31 through which an operator may move upwardly to occupy the seat 24. The casing 30 is actually utilized as a tank for fuel for driving the prime mover of my vehicle. Similarly, the casing may contain a tank for the oil that is used in the hydraulic system of my vehicle.

Referring now again to the rear traction unit 13, I propose to mount within this unit an internal combustion engine or other prime mover designated generally by reference numeral 33. A telescopic drive shaft 34 is connected by a universal joint 35 to the power transmission shaft of the engine 33 so that the telescopic shaft 34 may be utilized to drive the transmission T within the transmission casing 23 of the central control unit, as will be set forth below.

Traction unit 13 has a pair of traction wheels 36 driven through traction gears 37 in a conventional manner. The traction gears 37 are in turn actuated through a universal joint 38 by a telescopic shaft 39 that is preferably a duplicate of the shaft 34. Shaft 34 is itself connected by universal joint 40 with the transmission T so that the engine 33 may drive the transmission T. Transmission T is in turn connected through a universal joint 41 with shaft 39 so as to drive the shaft 39 and through it, the traction gears 37 and the traction wheels 36.

Transmission T is adapted through a further universal joint 43 to drive a shaft 44 that is preferably an exact duplicate of the shafts 34 and 39. Telescopic shaft 44 through a universal joint 45 drives the traction gears 46 of the forward traction unit 18, it being appreciated that traction gears 46 will drive the traction wheels 47 of the forward traction unit 18. It will further be understood that the traction gears 46 are exactly the same as the traction gears 37. Still further, it should be understood that the traction gears 46 are located in the same spaced relation to the central control unit as are the traction gears 37.

Still further, the shafts 34, 39 and 44 are all positioned in the longitudinal axis of the vehicle when all three units of the vehicle are so positioned that their longitudinal axes coincide. This actually is the position shown in FIG. 2. Because of this arrangement, the several shafts lie in the longitudinal line connecting the four king pins 16, 17, 20 and 22.

It should now be further emphasized that the four traction wheels, 36 and 47, and their traction gears 37 and 46 lie in symmetrically balanced relation to the transmission of the central unit 10 and the four king pins 16, 17, 20 and 22 so that the driving relationship of the traction units and the control unit are always maintained regardless of the angular position of each of the traction units relatively to the central unit, one such angular position being well illustrated in FIG. 3 to which reference will be made presently.

For swinging the forward and rearward traction units relatively to the central unit from the position shown in FIG. 2, to either of the positions illustrated in FIG. 3, I utilize a series of four steering rams designated by reference numerals 50, 51, 52 and 53. These steering rams are preferably duplicates and each ram is in a neutral position when the traction units are in the longitudinally aligned position illustrated in FIG. 2. Each ram is pivoted at one end to a traction unit and at its other end to the central unit. Thus, ram 50 is pivoted at 50a to the rear traction unit 13, and at 50b to the central unit 10. Ram 51 is similarly pivoted at 51a and 51b. Rams 52 and 53 are similarly pivoted at 52a and 52b and at 53a and 53b. The four rams are mounted in symmetrical relation to the longitudinal axes of the three units as can best be seen in FIG. 2. Similarly, the four rams are symmetrically related to the four king pins and the central transverse axis of the central unit 10.

In FIGS. 5 and 6, I show in detail just how the piston of ram 51 is connected at 51a to the rear traction unit 13. Similarly, I show just how the cylinder of the ram 51 is pivoted at 51b to the central unit 10. There is also shown in FIGS. 5 and 6 just how the cylinder of the ram 53 is pivoted at 53b to the central unit 10. Shown also in FIG. 5 are the ports 60 and 61 of the cylinder of ram 51.

For controlling the movement of hydraulic fluid to the several rams, I utilize two valves designated by reference numerals 62 and 63, valve 62 probably being best illustrated in FIGS. 5 and 6. Each of valves 62 and 63 is formed of two parts that are longitudinally slidable relatively to one another. One part is a valve piston designated by reference numeral 69, the other part being in the form of a cylinder designated by reference numeral 64. The cylinder portion of valve 62 is connected through a ball joint 65 to the rear traction unit 13 as is best seen in FIGS. 5, 6 and 7. The piston portion 69 of valve 62 is secured through a ball 66 to a lever 67 forming a part of the steering apparatus actuated by steering wheel S. The valves will not be described in detail because their construction is well known in the art. It is the combination I have conceived utilizing the valves that is my invention.

Valve 63 is mounted exactly as is the valve 62, but between the forward traction unit 18 and a lever 70 of the steering apparatus. As will be quite well seen in FIG. 7, the levers 67 and 70 are adapted to rotate with a shaft 71 which in turn is actuated by a system of levers 72 and conventional steering gears upon rotation of the steering shaft 73 by the wheel S. It will be seen that rotation of shaft 71 will through lever 67 move the piston 69 of valve 62 into the cylinder 64 of the valve 62 in the direction of the arrow above, rod 69 in FIG. 7.

This rotation of the shaft 71 will through the lever 70 move the piston rod of the valve 63 outwardly of the cylinder portion of the valve 63 in the direction of the arrow under the piston rod in FIG. 7. In other words, the two valves 62 and 63 are controlled simultaneously by the steering apparatus, but in opposed directions.

It will be appreciated that the two valves 62, 63, together with the steering apparatus and particularly levers 67, 70 of said steering apparatus, are positioned in balanced symmetrical relation relatively to the central control unit and the two traction units. Actually, the relationship while symmetrical, is also opposed so as to effect related controlling of the four steering rams.

Referring now more particularly to FIG. 7, reference numeral 75 designates a motor adapted to drive a pair of pumps 76, in turn receiving fluid through a flow director 77 from a tank 78. Fluid moves from pump 76 through a pressure relief valve 79 to valve 63 as can easily be determined through following conduit 80. Fluid flows from the valve 63 through a conduit 81 and back to the tank 78. Similarly, fluid flows through a pressure relief valve 79a and a conduit 83 to the cylinder 64 of the steering valve 62. Fluid flows through conduit 84 from the valve cylinder 64 back to the tank 78.

From cylinder 64 of steering valve 62 there is a conduit 85 which connects at 86 to a common conduit 87 transmitting fluid to the steering rams 50 and 51, it being noted that the common conduit 87 connects different ends of the steering rams 50, 51, so that admission of fluid into the rams will actuate one ram to steer in one direction and the other ram to steer in an opposed direction. Similarly, a conduit 90 extends from another port of the cylinder 64 of steering valve 62, and connects through a common conduit 91 to ends of the rams 50, 51 opposite those interconnected by common conduit 87.

Steering rams 52 and 53 are controlled in exactly the same manner as steering rams 50 and 51 through operation of the valve 63, but in different relation as will be understood by those skilled in the art.

It will be appreciated now that rotation of the steering wheel S in one direction will actuate the valves 62 and 63 so that the four steering rams will operate in unison to swing the forward and rear traction units into the extreme position shown in full lines in FIG. 3. Reverse rotation of wheel S will swing the same units into the opposite extreme position illustrated in dash and dot lines in FIG. 3. In each position, the central unit will remain symmetrical relatively to the two traction units, and the three power shafts will operate effectively. Through this relationship, effective driving of the traction units will take place with a minimum of swinging of the drive shafts, thereby contributing longer life to the drive shafts, the universal joints and the power mechanism. It will further be appreciated that through the utilization of the symmetrical construction I have outlined in detail, there can be varying relationships of the two traction units all through a simple interconnection of the operating parts.

In the vehicle shown in the drawings, I utilize a shovel loading mechanism designated generally by the reference numeral 100. However, it will be appreciated that other types of materials handling equipment may readily be mounted on either of the traction units and that traction may be maintained through the repositioning of the transmission T relatively to the central control unit, and by other variations of the basic assembly.

While there are certain features of considerable novelty in my shovel mechanism, these will be described in an application that will be filed presently, and will not be further set forth in this application.

I claim:

1. In a vehicle of the class described, a symmetrical central control unit, forward and rear traction units, means pivoting said traction units symmetrically to opposed portions of said symmetrical control unit in the longitudinal axis of said control unit and said traction units, said means supporting said central control unit through said pivot means, an engine on one of said traction units, means whereby said engine delivers power to said central control unit, a drive shaft extending longitudinally from each end of said control unit and driven by the power that the engine delivers to said unit, traction gears in each of said traction units driven by said shafts with said shafts in the longitudinal central axis of each traction unit and said control unit when the longitudinal central axes of said traction units are in longitudinal alignment with the longitudinal axis of said central control unit, a pair of steering rams extending between each of said traction units and one end of said symmetrical unit with said rams symmetrically arranged relatively to the longitudinal axes of said units, and hydraulic pressure lines interconnected between said rams to move said rams in opposed and also related manner so as to swing said traction units in opposed but related directions relatively to said central symmetrical unit.

2. In a vehicle of the class described, a symmetrical central control unit, forward and rear traction units, upper and lower pivots pivotally supporting each end of said symmetrical control unit on one end of each of said traction units, a drive shaft extending longitudinally from each end of said control unit, traction gears in each of said traction units driven by said shafts with said shafts in the longitudinal central axis of said units when the longitudinal axes of said traction units are in longitudinal alignment with the axis of said central control unit, a pair of steering rams extending between each of said traction units and one end of said symmetrical unit with said rams symmetrically arranged relatively to said units, a steering valve comprising relatively movable members extending between each of said traction units and said central control unit, and pivoted at one end to its traction unit, a steering mechanism on said central unit, means pivoting the other end of each steering valve to said steering mechanism whereby the said members of said valves are moved relatively to one another by said steering mechanism and by the pivoted swinging of said traction units relatively to said central unit, hydraulic pressure lines interconnected between said rams and valves to move said rams in opposed and also related manner through operation of said valves so as to swing said traction units in opposed but related directions relatively to said central symmetrical unit.

3. In a vehicle of the class described, a symmetrical central control unit, forward and rear traction units, upper and lower pivots pivotally supporting each end of said symmetrical control unit on one end of each said traction units, a pair of steering rams extending between each of said traction units and one end of said symmetrical unit with said rams symmetrically arranged relatively to said units, a steering valve comprising relatively movable members extending between each of said traction units and said central control unit, each of said valves having one of said members pivoted to its traction unit, a steering mechanism on said central unit, means pivoting the other member of each steering valve to said steering mechanism whereby the said members of said valves are moved relatively to one another by said steering mechanism and by the pivoted swinging of said traction units relatively to said central unit, hydraulic pressure lines interconnected between said rams and valves to move said rams in opposed and also related manner through operation of said valves so as to swing said traction units in opposed but related directions relatively to said central symmetrical unit.

4. In a vehicle of the class described, a central control unit, forward and rear traction units pivoted symmetrically to opposed portions of said control unit in the longitudinal axis of said control unit, an internal combustion engine on one of said traction units, a transmission on said central unit, a drive shaft extending longitudinally from each of the opposed ends of said transmission to said traction units, and from said internal combustion engine to said transmission, traction gears in each of said traction units driven by said shafts extending from said transmission, said three shafts lying in the longitudinal central axis of said units when said three units are in longitudinal alignment, said shafts being each of the same length and each connected by a universal joint at each of its ends to the particular mechanism relatively to which it functions, a pair of steering rams extending between each of said traction units and one end of said central control unit with said rams symmetrically arranged relatively to said units, and hydraulic pressure lines interconnected between said rams to move said rams in opposed and also related manner so as to swing said traction units in opposed but related directions relatively to said central unit while said shafts pivot also to remain in operating relation to the said particular mechanisms.

5. In a vehicle of the class described, a central control unit, forward and rear traction units pivoted symmetrically to opposed portions of said control unit in the longitudinal axis of said control unit, an internal combustion engine on one of said traction units, a transmission on said central unit, a drive shaft extending longitudinally from each of the opposed ends of said transmission to said traction units, and from said internal combustion engine to said transmission, traction gears in each of said traction units driven by said shafts extending from said transmission, said three shafts lying in the longitudinal central axis of said units when said three units are in longitudinal alignment, said shafts being each of the same length and each connected by a universal joint at each of its ends to the particular mechanism relatively to which it functions, and steering mechanism for pivoting said traction units relatively to said central unit while said three shafts pivot on said universal joints to drive said vehicle.

6. In a vehicle of the class described, a symmetrical central control unit, forward and rear traction units, means pivoting said traction units symmetrically to opposed portions of said symmetrical control unit in the longitudinal axis of said control unit and said traction units, said means supporting said central control unit through said pivot means, an engine on one of said traction units, means whereby said engine delivers power to said central control unit, a drive shaft extending longitudinally from each end of said control unit and driven by the power that the engine delivers to said unit, traction gears in each of said traction units driven by said shafts with said shafts in the longitudinal central axis of each traction unit and said control unit when the longitudinal central axes of said traction units are in longitudinal alignment with the longitudinal axis of said central control unit, said shafts being each of the same length and connected by a universal joint at each end to the mechanisms with which they coact, a pair of steering rams extending between each of said traction units and one end of said symmetrical unit with said rams symmetrically arranged relatively to the longitudinal axes of said units, and hydraulic pressure lines interconnected between said rams to move said rams in opposed and also related manner so as to swing said traction units in opposed but related directions relatively to said central symmetrical unit while said shafts pivot also to remain in operating relation to said traction gears.

7. In a vehicle of the class described, a central control unit, a power transmission on said unit, forward and rear traction units pivoted symmetrically to opposed end portions of said control unit in the longitudinal axis of said control unit and thereby supporting said unit, an engine mounted on one of said traction units, a drive shaft extending longitudinally from the forward portion and also from the rear of said transmission, traction gears in each of said traction units driven by said shafts with said shafts in the longitudinal central axis of said traction and control units when said units are in axial longitudinal alignment, said shafts being each the same in length and connected to the transmission and traction gears by universal joints, means through which said engine delivers power to said power transmission for driving said shafts, and steering means for swinging said traction units in opposed relation to said central unit with said shafts pivoting on said universal joints while driving said traction gears.

8. In a vehicle of the class described, a central control unit, forward and rear traction units pivoted symmetrically to opposed portions of said symmetrical control unit in the longitudinal axis of said control unit and supporting said central unit, a pair of steering rams extending between each of said traction units and one end of said symmetrical unit with said rams symmetrically arranged relatively to the longitudinal control axis of said units, a pair of valves having each a pair of relatively movable parts, a steering mechanism mounted on said central control unit, means pivoting one of said relatively movable parts of each valve to said steering mechanism and the other part of one valve to the forward traction unit and the other part of the second valve to the rear traction unit, whereby the two parts of each valve move in response to the movement of the steering mechanism and the swinging of said traction units relatively to said central unit, and hydraulic pressure lines interconnected between said rams and valves to move said rams in opposed and also related manner so as to swing said traction units in opposed but related directions relatively to said central unit.

9. In a vehicle of the class described, a central control unit, forward and rear traction units pivoted symmetrically to opposed portions of said symmetrical control unit in the longitudinal axis of said control unit and supporting said central unit, a pair of duplicate steering rams extending between each of said traction units and one end of said symmetrical unit with said rams symmetrically arranged relatively to the longitudinal control axis of said units, a pair of duplicate valves having each a pair of relatively movable parts, a steering mechanism mounted on said central control unit, means pivoting one of said relatively movable parts of each valve to said steering mechanism and the other part of one valve to the forward traction unit and the other part of the second valve to the rear traction unit, whereby the two parts of each valve move in response to the movement of the steering mechanism and the swinging of said traction units relatively to said central unit, and hydraulic pressure lines interconnected between said rams and valves to move said rams in opposed and also related manner so as to swing said traction units in opposed but related directions relatively to said central unit.

10. In a vehicle of the class described, a symmetrical central control unit having forwardly and rearwardly extending like pivot portions, a tank at each side of said unit medially of said pivot portions and having each a stair forming exterior surface, forward and rear traction units pivoted symmetrically to said like pivot portions of said symmetrical control unit for supporting said control unit for movement with said traction units, a steering apparatus on said control unit, a pair of steering rams extending between each of said traction units and the adjacent end of said symmetrical control unit with said rams symmetrically arranged longitudinally and transversely relatively to the longitudinal axes of said units, hydraulic pressure lines interconnected between said rims to move said rams in opposed and also related manner so as to swing said traction units in opposed but related directions relatively to said central symmetrical unit, and valve means for said hydraulic pressure lines controlled by said steering apparatus.

11. In a vehicle of the class described, a symmetrical central control unit, forward and rear traction units having each traction wheels, means pivoting opposed end portions of said symmetrical control unit to said traction unit to form a three part vehicle with said central unit supported by said traction units through said pivoting means, a steering apparatus on said control unit, a pair of steering rams extending between each of said traction units and the adjacent end of said symmetrical control unit with said rams symmetrically arranged longitudinally and transversely relatively to the longitudinal axes of said units, a steering valve at each side of the longitudinal center line of said control unit, with each valve having like relatively movable parts, means securing one of said relatively movable parts of each valve to said steering apparatus for movement thereby, but in opposed relation, means symmetrically securing the other of said relatively movable parts of one valve to one traction unit and of the other valve to the other traction unit, and hydraulic pressure lines interconnected between said rams and valves to move said rams in opposed and also related manner under control of said steering apparatus and valves so as to swing said traction units in opposed but related directions relatively to said central symmetrical unit.

12. In a vehicle of the class described, a symmetrical central control unit, having forwardly and rearwardly extending like pivot portions, a tank at each side of said unit medially of said pivot portions, forward and rear traction units pivoted symmetrically to said like pivot portions of said symmetrical control unit for supporting said control unit for movement with said traction units, an engine mounted on one of said traction units, a transmission carried by said central control unit between said tanks, a drive shaft extending between said engine and said transmission, a drive shaft extending between said transmission and each of said traction units, a steering apparatus on said control unit, a pair of steering rams extending between each of said traction units and the adjacent end of said symmetrical control unit with said rams symmetrically arranged longitudinally and transversely relatively to the longitudinal axes of said units, hydraulic pressure lines interconnected between said rams to move said rams in opposed and also related manner so as to swing said traction units in opposed but related directions relatively to said central symmetrical unit, and valve means for said hydraulic pressure lines controlled by said steering apparatus.

13. In a vehicle of the class described, a central control unit, forward and rear traction units pivoted symmetrically to opposed portions of said control unit in the longitudinal axis of said control unit, an internal combustion engine on one of said traction units, a transmission on said central unit, a drive shaft extending longitudinally from each of the opposed ends of said transmission to said traction units, and from said internal combustion engine to said transmission, traction gears in each of said traction units driven by said shafts extending from said transmission, said three shafts being equipped with universal joint and lying in the longitudinal central axis of said units when said three units are in longitudinal alignment, and steering mechanism for pivoting said traction units relatively to said central unit while said three shafts pivot on said universal joints to drive said vehicle.

14. In a vehicle of the class described, a symmetrical central control unit, a forward traction unit, and a rearward traction unit, materials handling equipment mounted in a forwardly extending position on said forward traction unit, motor means having a considerable weight mounted on the rearward traction unit, means including a transmission mounted on said central control unit through which said motor means will deliver power for operating both traction units, pivot portions rigidly mounted on forward and rearward ends of the central control unit, on the rearward end of the forward traction unit, and on the forward end of the rearward traction unit, pivot bearings engaging said rigidly mounted pivot portions at vertically spaced points whereby to hold the forward traction unit and its materials handling equipment against twisting in a longitudinal axis relatively to the central and rearward units while articulating the units for swinging in a lateral direction relatively to each other, steering hydraulic rams for swinging the traction units on said pivot bearings, and control means for controlling said rams to steer both traction units through equal angles relatively to the central control unit, said central control unit in effect moving laterally on the pivot bearings whereby to contribute better counterbalancing of said materials handling equipment while the forward and rearward units are steered.

References Cited by the Examiner

UNITED STATES PATENTS

| | | | |
|---|---|---|---|
| 2,168,480 | 8/1939 | Johnson | 180—79.2 X |
| 2,494,324 | 1/1950 | Wright | 180—50 X |
| 2,883,774 | 4/1959 | Clifford | 180—51 |

FOREIGN PATENTS 1,127,092    12/1956    France.

A. HARRY LEVY, *Primary Examiner.*